United States Patent Office 3,255,249
Patented June 7, 1966

3,255,249
2-BRANCHED LOWER ALKYL-AMINO-1-(INDAN-, HYDROGENATED INDAN- AND HYDROGENATED NAPHTH-2-YL) LOWER ALKANOLS
Ralph Howe and Leslie Harold Smith, Macclesfield, and John Stuart Stephenson, High Wycombe, England, assignors to Imperial Chemical Industries Limited, London, England, a corporation of Great Britain
No Drawing. Filed Apr. 26, 1963, Ser. No. 276,095
15 Claims. (Cl. 260—563)

This invention relates to new homocyclic compounds which possess useful therapeutic properties.

According to the invention we provide homocyclic compounds of the formula:

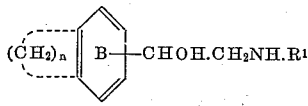

wherein $R^1$ stands for a lower alkyl radical, optionally substituted, wherein $n$ stands for 3 or 4, wherein the benzene ring (B) may optionally be partially or fully reduced, and wherein the ring B may optionally be further substituted by a methyl radical, and the salts thereof, but excluding the known compound 2-methylamino-1-(5,6,7,8-tetrahydronaphth-2-yl)ethanol.

Specific homocyclic compounds of the present invention are 2-isopropylamino-1-(5,6,7,8-tetrahydronaphth-2-yl)-ethanol,
2-[N-(1-phenylprop-2-yl)amino]-1-(5,6,7,8-tetrahydronaphth-2-yl)ethanol,
1-decahydronaphth-2-yl-2-isopropylaminoethanol,
2-[N-(1-hydroxy-2-methylprop-2-yl)amino]-1-(5,6,7,8-tetrahydronaphth-2-yl)ethanol,
1-indan-5-yl-2-isopropylaminoethanol,
2-s-butylamino-1-indan-5-ylethanol,
2-t-butylamino-1-indan-5-ylethanol,
2-[2-(3,4-dimethoxyphenyl)ethylamino]-1-indan-5-ylethanol,
2-(1-hydroxy-2-methyl-prop-2-ylamino)-1-indan-5-ylethanol,
2-t-butylamino-1-(5,6,7,8-tetrahydronaphth-2-yl)ethanol and
2-isopropylamino-1-(3-methyl-5,6,7,8-tetrahydronaphth-2-yl)ethanol,
and the salts thereof, and of these, preferred compounds are
2-isopropylamino-1-(5,6,7,8-tetrahydronaphth-2-yl)-ethanol,
2-[N-(1-phenylprop-2-yl)amino]-1-(5,6,7,8-tetrahydro-2-yl)ethanol,
2-ethylamino-1-(5,6,7,8-tetrahydronaphth-2-yl)ethanol,
2-[N-1-hydroxy-2-methyl-prop-2-yl)amino]-1-(5,6,7,8-tetrahydronaphth-2-yl)ethanol, and
2-t-butylamino-1-indan-5-ylethanol.

As suitable salts of the said homocyclic compounds there may be mentioned acid-addition salts, for example salts derived from inorganic acids, for example hydrochlorides, hydrobromides, phosphates or sulphates, or salts derived from organic acids, for example oxalates, lactates, tartrates, acetates, salicyclates or citrates.

It will be seen from the above that the compounds of the invention may be selected from the group consisting of compounds of the formula:

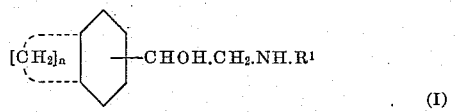

and compounds of the formula:

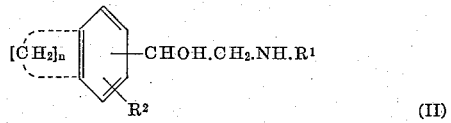

wherein $R^1$ is selected from the group consisting of branched-chain alkyl of from 3 to 4 carbon atoms and alkyl of not more than 4 carbon atoms substituted by a radical selected from the group consisting of hydroxy, phenyl and 3,4-dimethoxyphenyl; $n$ stands for an integer selected from the group consisting of 3 and 4; $R^2$ is selected from the group consisting of hydrogen and methyl; and the acid addition salts thereof.

According to a further feature of the invention we provide a process for the manufacture of the said homocyclic compounds which comprises the reduction of a compound of the formula:

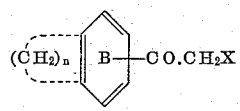

wherein B and $n$ have the meanings stated above, wherein X stands for a halogen atom, for example a chlorine or bromine atom, followed by reaction of the reduction product so obtained with an amine of the formula $R^1 \cdot NH_2$, wherein $R^1$ has the meaning stated above.

The said reduction may be effected by the use of sodium borohydride in the presence of a diluent or solvent, for example methanol or cyclohexane, and at a temperature of about 0–25° C. The said reduction may alternatively be effected by the use of aluminium isoproproxide in the presence of a diluent or solvent, for example isopropanol. The reduction product may be reacted with the said amine in the presence of a diluent or solvent, for example ethanol, and the process may be accelerated or completed by the application of heat.

It is to be understood that the said reduction product is believed to be one or other of the compounds of the formulae:

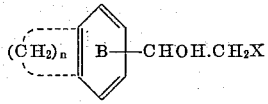

and

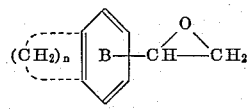

wherein B, X and $n$ have the meaning stated above, or a mixture thereof, and either of these compounds or a mixture thereof can be used as starting material in the above process for the manufacture of the said homocyclic compounds.

According to a further feature of the invention we provide a process for the manufacture of the said homocyclic compounds which comprises the reduction of an aminoacetyl derivative of the formula:

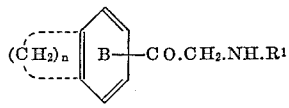

wherein $R^1$, B and $n$ have the meanings stated above, or a salt thereof.

The said reduction process involving an amino-acetyl derivative may be carried out, for example, by the use of sodium borohydride as reducing agent in the presence of a diluent or solvent, for example methanol, or by the use of lithium aluminium hydride as reducing agent in the presence of a diluent or solvent, for example ether or tetrahydrofuran, or by catalytic hydrogenation, for example by means of hydrogen and a hydrogenation catalyst such as a platinum or palladium-on-carbon catalyst, conveniently in the presence of an inert diluent or solvent, for example aqueous methanol. The said aminoacetyl derivatives themselves may be obtained by the interaction of the corresponding haloacetyl derivative, for example the bromoacetyl derivative, with the corresponding amine in an inert diluent or solvent, for example ethanol.

According to a further feature of the invention we provide a process for the manufacture of the said homocyclic compounds which comprises the reduction of a compound of the formula:

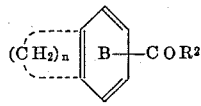

wherein $R^2$ stands for the aldehyde radical (CHO) or for a radical of the formula —CH(OH)$_2$, and wherein B and $n$ have the meanings stated above, in the presence of an amine of the formula $R^1.NH_2$ wherein $R^1$ has the meaning stated above, or a salt thereof.

The last-named reduction may be carried out by catalytic hydrogenation, for example hydrogenation in the presence of a platinum catalyst. The said catalytic hydrogenation may be carried out in an inert diluent or solvent, for example ethanol. The said catalytic hydrogenation may be carried out at atmospheric pressure or at elevated pressure, and it may be carried out at ambient temperature or at an elevated temperature. The last-named reduction may alternatively be carried out by the use of a metal hydride, for example sodium borohydride, in an inert diluent or solvent, for example methanol or ethanol, at a temperature of about 0–25° C. The compounds used as starting material may be obtained by the interaction of the corresponding haloacetyl derivative, for example the bromoacetyl derivative, with a dialkyl sulphoxide, for example dimethyl sulphoxide, or by interaction of the corresponding acetyl derivative with an oxidising agent, for example selenium dioxide.

According to a further feature of the invention we provide a process for the manufacture of those of the homocyclic compounds of the invention wherein $n$ stands for 4 which comprises the reduction of a compound of the formula:

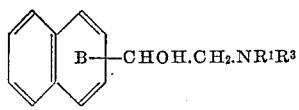

wherein $R^3$ stands for hydrogen or for a hydrogenolysable radical, and wherein $R^1$ and B have the meanings stated above, or a salt thereof.

It is to be understood that the said reduction of those compounds defined above wherein $R^3$ stands for a hydrogenolysable radical brings about the replacement of $R^3$ by a hydrogen atom.

As suitable values for $R^3$ when it stands for a hydrogenolysable radical there may be mentioned, for example, a benzyl radical, optionally substituted, and a benzyloxycarbonyl radical.

The reduction may be carried out by catalytic hydrogenation in an inert diluent or solvent, for example ethanol. As suitable catalysts for the hydrogenation there may be mentioned, for example, Raney nickel, rhodium-on-carbon, and platinum oxide in the presence of hydrochloric acid. The extent of the reduction depends mainly upon the catalyst used. Thus, hydrogenation at an elevated temperature and pressure, for example a temperature of 125° C. and a pressure of 125 atmospheres, in the presence of a Raney nickel catalyst affords the corresponding 5,6,7,8 - tetrahydronaphthyl derivative, whereas hydrogenation under the same temperature and pressure conditions in the presence of a rhodium-on-carbon catalyst affords the corresponding decahydronaphthyl derivative.

The homocyclic compounds of the present invention are $\beta$-adrenergic blocking agents and they are therefore of value in the treatment or prophylaxis of coronary artery disease.

Thus according to yet a further feature of the invention we provide pharmaceutical compositions containing as active ingredient one or more homocyclic compounds of the formula:

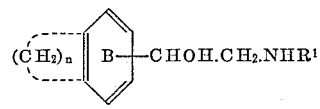

wherein $R^1$, B and $n$ have the meanings stated above, and the salts thereof, in admixture with non-toxic, pharmaceutically-acceptable diluents or carriers therefor.

As suitable compositions there may be mentioned for example tablets, capsules, aqueous or oily solutions, aqueous or oily suspensions, emulsions, injectable aqueous or oily solutions or suspensions and dispersible powders.

The invention is illustrated but not limited by the following examples in which parts are by weight.

*Example 1*

1 part of sodium borohydride is added during 10 minutes to a stirred solution of 3 parts of 2-isopropylaminoacetyl-5,6,7,8-tetrahydronaphthalene hydrobromide in 50 parts of methanol at 0° C. After 3 hours the methanol is evaporated at about 30° C. under reduced pressure. 80 parts of 0.5 N hydrochloric acid are added to the residue and the mixture is washed with 20 parts of ether. 30 parts of 2 N sodium hydroxide solution are added to the aqueous acid layer and the mixture is extracted with 50 parts of ether. The ethereal extract is washed with water, dried with anhydrous magnesium sulphate, and the ether is evaporated. The residue is crystallised from a mixture of light petroleum (B.P. 40–60° C.) and ethyl acetate, and there is thus obtained 2-isopropylamino-1-(5, 6,7,8-tetrahydronaphth-2-yl)ethanol, M.P. 84–85° C. The corresponding hydrochloride has M.P. 157° C. (crystallised from ethyl acetate).

The 2-isopropylaminoacetyl-5,6,7,8-tetrahydronaphthalene hydrobromide used as starting material may be obtained as follows:

4 parts of 2-α-bromoacetyl-5,6,7,8-tetrahydronaphthalene are dissolved in a solution of 1 part of isopropylamine in 25 parts of ethanol, and the mixture is kept at 20° C. for 16 hours. 100 parts of ethyl acetate are added and after 1 hour the mixture is filtered. The solid residue is crystallised from a mixture of methanol and ethyl acetate and there is thus obtained 2-isopropylaminoacetyl-5,6,7,8-tetrahydronaphthalene hydrobromide, M.P. 224–226° C.

*Example 2*

The process of Example 1 is repeated using 2-[N-(1-phenylprop - 2 - yl)aminoacetyl]-5,6,7,8-tetrahydronaphthalene hydrobromide in place of 2-isopropylaminoacetyl-5,6,7,8-tetrahydronaphthalene hydrobromide. There is thus obtained 2-[N-(1-phenylprop-2-yl)amino]-1-(5,6,7,8-tetrahydronaphth-2-yl)ethanol as a gum. A solution of 1 part of this gum in 5 parts of methanol is added to a solution of 0.41 part of oxalic acid dihydrate in 10 parts of methanol. 10 parts of methanol are removed by evaporation. Ethyl acetate is added until the solution becomes turbid. The solid which separates on standing is isolated by filtration and crystallised from a mixture of methanol and ethyl acetate. There is thus obtained 2-[N-(1-phenylprop-2-yl)amino]-1-(5,6,7,8-tetrahydronaphth-2-yl)ethanol hydrogen oxalate, M.P. 158–159° C.

The 2-[N-(1-phenylprop-2-yl)aminoacetyl]-5,6,7,8-tetrahydronaphthalene hydrobromide used as starting material may be obtained by a similar process to that described in Example 1 for the preparation of 2-isopropylaminoacetyl-5,6,7,8-tetrahydronaphthalene hydrobromide, but replacing the 1 part of isopropylamine by 2.15 parts of 1-phenylprop-2-ylamine. There is thus obtained 2-[N-(1-phenylprop-2-yl)aminoacetyl]-5,6,7,8-tetrahydronaphthalene hydrobromide, M.P. 227–228° C.

Example 3

22 parts of sodium borohydride are added during 30 minutes to a stirred solution of 77 parts of 2-α-bromoacetyl-5,6,7,8-tetrahydronaphthalene in 200 parts of cyclohexane at 0–15° C. After 1 hour the mixture is poured onto ice and extracted with 300 parts of ether. The ethereal extract is washed with water, dried with anhydrous magnesium sulphate and then the solvent is evaporated. The crude residual oil consists of a mixture of 2-bromo-1-(5,6,7,8-tetrahydronaphth-2-yl)ethanol and (5,6,7,8-tetrahydronaphth-2-yl)-2-oxiran.

10 parts of the above oil, 20 parts of isopropylamine and 200 parts of ethanol are heated under reflux for 16 hours and then the ethanol and excess of isopropylamine are evaporated. 100 parts of 1 N hydrochloric acid are added to the residue and the mixture is washed with 50 parts of ether. 75 parts of 2 N sodium hydroxide solution are added to the aqueous acid layer and the mixture is extracted with 100 parts of ether. The ethereal extract is washed with water, dried with anhydrous magnesium sulphate and then the ether is evaporated to give a residual gum. A solution of 1 part of the residual gum in 5 parts of methanol is added to a solution of 0.27 part of oxalic acid dihydrate in 10 parts of methanol, and then about 10 parts of methanol are evaporated. Ethyl acetate is added until the solution becomes turbid. The mixture is allowed to stand, and is then filtered. The solid residue is crystallised from a mixture of methanol and ethyl acetate. There is thus obtained 2-isopropylamino-1-(5,6,7,8-tetrahydronaphth-2-yl)ethanol hemioxalate, M.P. 214° C.

Example 4

1 part of sodium borohydride is added during 10 minutes to a stirred solution of 2 parts of crude (5,6,7,8-tetrahydronaphth-2-yl)glyoxal and 3 parts of ethylamine in 20 parts of methanol at 0° C. The mixture is stirred at 0° C. during 2 hours and then the solvent is evaporated in vacuo. 100 parts of 0.5 N hydrochloric acid are added, and the mixture is washed with 30 parts of ether. 35 parts of 2 N sodium hydroxide solution are added to the aqueous acid layer, and then the mixture is extracted with 100 parts of ether. The ethereal extract is washed with water, dried, and evaporated to dryness. The residue is crystallised from ethyl acetate and there is obtained 2-ethylamino-1-(5,6,7,8-tetrahydronaphth-2-yl)ethanol, M.P. 85–86° C.

The crude (5,6,7,8-tetrahydronaphth-2-yl)glyoxal used as starting material may be obtained as follows:

A solution of 5 parts of 2-α-bromoacetyl-5,6,7,8-tetrahydronaphthalene in 70 parts of dimethyl sulphoxide is kept at ambient temperature during 3 days. The solution is poured onto 200 parts of ice and then extracted with 200 parts of ether. The ethereal extract is washed with 30 parts of saturated sodium hydrogen carbonate solution, and then with water, and is then dried over anhydrous magnesium sulphate. The ether is evaporated. The residual gum consists of crude (5,6,7,8-tetrahydronaphth-2-yl)glyoxal.

Example 5

A mixture consisting of 10 parts of 2-isopropylamino-1-naphth-2-ylethanol, 10 parts of ethanol and 1 part of Raney nickel catalyst is shaken in an atmosphere of hydrogen at 125° C. and 125 atmospheres pressure for 6 hours. 50 parts of ethanol are added, the mixture is filtered, and the filtrate is evaporated to dryness in vacuo. 50 parts of 2 N hydrochloric acid are added to the residue and the mixture is shaken with 50 parts of ether and the ethereal layer is then discarded. 20 parts of 11 N sodium hydroxide solution are added to the residual aqueous mixture and the mixture is extracted with 50 parts of ether. The ethereal extract is dried over magnesium sulphate, and the ether is removed by evaporation in vacuo. The residue is crystallised from light petroleum (B.P. 60–80° C.) and there is thus obtained 2-isopropylamino-1-(5,6,7,8-tetrahydronaphth-2-yl)ethanol, M.P. 84–85° C.

Example 6

2.3 parts of 2-isopropylamino-1-naphth-2-ylethanol and 0.5 part of 5% rhodium-on-carbon catalyst are shaken in an atmosphere of hydrogen at 125° C. and 125 atmospheres pressure for 6 hours. 50 parts of ethanol are added, the mixture is filtered, and the filtrate is evaporated to dryness in vacuo. 50 parts of 2 N hydrochloric acid are added to the residue, and the mixture is washed with 50 parts of ether. 20 parts of 11 N sodium hydroxide solution are added to the aqueous acid layer, and the mixture is extracted with 50 parts of ether. The ethereal extract is dried over magnesium sulphate and filtered, and the filtrate is added to a solution of 1 part of oxalic acid in 50 parts of ether. The mixture is filtered and the solid residue is crystallised from a mixture of 1 part of ethanol and 10 parts of ethyl acetate. There is thus obtained 1-decahydronaphth-2-yl-2-isopropylaminoethanol hydrogen oxalate, M.P. 122–124° C.

Example 7

The process of Example 4 is repeated except that 1.5 parts of 2-amino-2-methylpropan-1-ol are used in place of the 3 parts of ethylamine. There is thus obtained 2-[N-(1-hydroxy-2-methylprop-2-yl)amino]-1-(5,6,7,8-tetrahydronaphth-2-yl)ethanol, M.P. 118–119° C. (crystallised from ethyl acetate).

Example 8

The process of Example 1 is repeated except that 5-isopropylaminoacetylindane hydrochloride is used in place of the 2-isopropylaminoacetyl-5,6,7,8-tetrahydronaphthalene hydrobromide. There is thus obtained 1-indan-5-yl-2-isopropylaminoethanol, M.P. 99° C.

The 5-isopropylaminoacetylindane hydrochloride used as starting material may be obtained as follows:

4 parts of 5-α-bromoacetylindane are dissolved in a solution of 1 part of isopropylamine in 30 parts of methanol, and the mixture is kept at 0° C. for 16 hours. The methanol is evaporated at about 30° C. under reduced pressure. 80 parts of 0.5 N hydrochloric acid are added to the residue and the mixture is washed with 20 parts of ether. 30 parts of 2 N sodium hydroxide solution are added to the aqueous acid layer, and the mixture is extracted with 70 parts of ether. The ethereal extract is washed with water, dried with anhydrous magnesium sulphate, and the ether is evaporated. The residue is dissolved in 30 parts of ether, and ethereal hydrogen chloride is added until precipitation of solid is substantially complete. The mixture is filtered and the solid residue is crystallised from a mixture of methanol and ethyl acetate. There is thus obtained 5-isopropylaminoacetylindane hydrochloride, M.P. 221° C.

*Example 9*

The process of Example 1 is repeated except that 2 parts of 5-s-butylaminoacetylindane hydrochloride are used in place of 3 parts of 2-isopropylaminoacetyl-5,6,7,8-tetrahydronaphthalene hydrobromide. There is thus obtained 2-s-butylamino-1-indan-5-ylethanol M.P. 75–76° C.

The 5-s-butylaminoacetylindane hydrochloride used as starting material may be obtained by a similar process to that described in Example 8 for the preparation of 5-isopropylaminoacetylindane hydrochloride but using 2.4 parts of s-butylamine in place of 1 part of isopropylamine. There is thus obtained 5-s-butylaminoacetylindane hydrochloride, M.P. 180° C.

*Example 10*

The process of Example 1 is repeated except that 2 parts of s-t-butylaminoacetylindane hydrochloride are used in place of 3 parts of 2-isopropylaminoacetyl-5,6,7,8-tetrahydronaphthalene hydrobromide. There is thus obtained 2-t-butylamino-1-indan-5-ylethanol M.P. 121–122° C.

The 5-t-butylaminoacetylindane hydrochloride used as starting material may be obtained by a similar process to that described in Example 8 for the preparation of 5-isopropylaminoacetylindane but using 3.7 parts of t-butylamine in place of 1 part of isopropylamine. There is thus obtained 5-t-butylaminoacetylindane hydrochloride M.P. 237–238° C.

*Example 11*

The process of Example 1 is repeated except that 2.3 parts of 5-n-butylaminoacetylindane hydrochloride are used in place of 3 parts of 2-isopropylaminoacetyl-5,6,7,8-tetrahydronaphthalene hydrobromide. There is thus obtained 2-n-butylamino-1-indan-5-ylethanol M.P. 94–95° C.

The 5-n-butylaminoacetylindane hydrochloride used as starting material may be obtained by a similar process to that described in Example 8 for the preparation of 5-isopropylaminoacetylindane but using 3.7 parts of n-butylamine in place of 1 part of isopropylamine. There is thus obtained 5-n-butylaminoacetylindane hydrochloride M.P. 209–210° C.

*Example 12*

The process of Example 1 is repeated except that 2.5 parts of 5-[2-(3,4-dimethoxyphenyl)ethylaminoacetyl]-indane hydrobromide are used in place of 3 parts of 2-isopropylaminoacetyl - 5,6,7,8-tetrahydronaphthalene hydrobromide. There is thus obtained 2-[2-(3,4-dimethoxyphenyl)ethylamino]-1-indan-5-ylethanol, M.P. 111–112° C.

The 5-[2-(3,4-dimethoxyphenyl)ethylaminoacetyl - indane hydrobromide used as starting material may be obtained as follows:

10 parts of 5-α-bromoacetylindane are dissolved in a solution of 7.5 parts of 2-(3,4-dimethoxyphenyl)-ethylamine in 60 parts of methanol, and the mixture is kept at ambient temperature for 16 hours. The mixture is filtered and the solid residue is crystallised from ethanol. There is thus obtained 5 - [2 - (3,4 - dimethyloxyphenyl)-ethylaminoacetyl]-indane hydrobromide, M.P. 215–216° C.

*Example 13*

1 part of sodium borohydride is added during 30 minutes to a stirred solution of 2 parts of indan-5- ylglyoxal hydrate and 1.2 parts of ethylamine in 40 parts of methanol of 0° C. The mixture is stirred at 0° C. during 2 hours and then the solvent is evaporated in vacuo. 100 parts of 0.5 N hydrochloric acid are added, and the mixture is washed with 30 parts of ether. 35 parts of 2 N sodium hydroxide solution are added to the aqueous acid layer and then the mixture is extracted with 100 parts of ether. The ethereal extract is washed with water, dried, and then evaporated to dryness. The residue is crystallised from ethyl acetate and there is thus obtained 2-ethylamino-1-indan-5-ylethanol, M.P. 110–111° C.

The indan-5-ylgyloxal hydrate used as starting material may be obtained as follows:

A solution of 5 parts of 5-α-bromoacetylindane in 40 parts of dimethylsulphoxide is kept at ambient temperature during 2 days. The mixture is poured onto 200 parts of crushed ice and then extracted with 200 parts of ether. The ethereal extract is washed with 30 parts of a saturated solution of sodium hydrogen carbonate in water, and then with water, and is then dried with anhydrous magnesium sulphate. The ether is evaporated. The residual solid is crystallised from water and there is thus obtained indan-5-ylglyoxal hydrate, M.P. 123–124° C.

*Example 14*

The process of Example 13 is repeated except that 3.6 parts of 2-amino-2-methyl-1-propanol are used in place of 1.2 parts of ethylamine. There is thus obtained 2-(1-hydroxy-2-methylprop-2-ylamino)-1-indan - 5 - ylethanol, M.P. 115–116° C.

*Example 15*

The process of Example 1 is repeated except that 2.3 parts of 2-t-butylaminoacetyl-5,6,7,8-tetrayhdronaphthalene hydrochloride are used in place of 3 parts of 2-isopropylaminoacetyl-5,6,7,8 - tetrahydronaphthalene hydrobromide. There is thus obtained 2-t-butylamino-1-(5,6,7,8-tetrahydronaphth-2-yl)ethanol, M.P. 85–86° C. The corresponding hydrochloride has M.P. 203–204° C. (crystallised from a mixture of methanol and ether).

The 2-t-butylaminoacetyl - 5,6,7,8 - tetrahydronaphthalene hydrochloride may be obtained as follows:

10 parts of 2-α-bromoacetyl-5,6,7,8-tetrahydronaphthalene are dissolved in a solution of 8.7 parts of t-butylamine in 50 parts of methanol, and the mixture is kept at 0° C. for 16 hours. The methanol is evaporated in vacuo. 250 parts of 0.5 N hydrochloric acid are added to the residue and the mixture is shaken with 50 parts of ether. The organic phase is separated and discarded. 50 parts of 4 N sodium hydroxide are added to the aqueous phase and the mixture is extracted with 200 parts of ether. The ethereal extract is washed with water, dried with anhydrous magnesium sulphate, and the ether is evaporated. The residue is dissolved in 100 parts of ether, and to this solution on a solution of hydrogen chloride in ether is slowly added until the precipitation of solid is substantially complete. The mixture is filtered and the solid residue is crystallised from a mixture of methanol and ether. There is hus obtained 2-t-butylaminoacetyl-5,6,7,8 - tetrahydronaphthalene hydrochloride, M.P. 240–241° C.

*Example 16*

A mixture of 1 part of 2-N-benzyl-N-isopropylamino-1-naphth-2-ylethanol hydrochloride, 16 parts of ethanol, 0.2 part of concentrated hydrochloric acid, and 0.3 part of platinum oxide is shaken at ambient temperature and atmospheric pressure in an atmosphere of hydrogen until the absorption of hydrogen ceases. The mixture is filtered and the filtrate is evaporated to dryness under reduced pressure. The residue is crystallised from ethyl acetate and there is thus obtained 2-isopropylamino-1-(5,6,7,8-tetrahydronaphth - 2 - yl)ethanol hydrochloride, M.P. 157° C.

The 2-N-benzyl-N-isopropylamino-1-naphth-2-ylethanol hydrochloride used as starting material may be obtained as follows:

A solution of 3 parts of 2-N-benzyl-N-isopropylamino-acetylnaphthalene, M.P. 66–67° C. (from 2-α-bromoacetylnaphthalene and N-benzyl-N-isopropylamine in 80 parts of ethanol containing 1 part of platinum oxide is shaken in an atmosphere of hydrogen at ambient temperature and atmospheric pressure for 20 hours. The mixture is filtered and the filtrate is evaporated to dryness. The residue is dissolved in 30 parts of ether, and ethereal hydrogen chloride is added until the separation of solid is substantially complete. The mixture is filtered. The solid residue is crystallised from a mixture of methanol and ethyl acetate, and there is thus obtained 2-N-benzyl-N-isopropylamino-1-naphth-2-ylethanol hydrochloride, M.P. 154° C.

Example 17

12.5 parts of selenium dioxide are added to a solution of 20 parts of 2-acetyl-3-methyl-5,6,7,8-tetrahydronaphthalene in a mixture of 150 parts of dioxan and 10 parts of water, and the mixture is heated at 100° C. for 5 hours. The mixture is cooled and filtered, and the filtrate is evaporated to dryness. The residue is dissolved in a solution of 7 parts of isopropylamine in 160 parts of ethanol. The solution is kept for 10 minutes, and is then stirred and cooled in an ice bath while 9 parts of sodium borohydride are added during 1 hour. 10 parts of water are added to the mixture which is then evaporated to dryness in vacuo. The residue is shaken with a mixture of 200 parts of ether and 50 parts of water. The ethereal layer is separated, washed with water, dried with anhydrous magnesium sulphate, and is then evaporated to dryness. The solid residue is crystallised from ethyl acetate and there is thus obtained 2-isopropylamino-1-(3-methyl-5,6,7,8-tetrahydronaphth-2-yl)ethanol, M.P. 108° C.

The 2-acetyl-3-methyl-5,6,7,8-tetrahydronaphthalene used as starting material may be obtained as follows:

A solution of 15 parts of 2-methyl-5,6,7,8-tetrahydronaphthalene and 9 parts of acetyl chloride in 60 parts of carbon disulphide is added during 1 hour to a stirred suspension of 15 parts of aluminium chloride in 125 parts of carbon disulphide at 0° C. After 16 hours, 200 parts of a mixture of crushed ice and water are added and the resulting mixture is then distilled in steam until the carbon disulphide has been removed. The residual mixture is extracted with 200 parts of ether. The ethereal extract is washed with water, dried with anhydrous magnesium sulphate, and the ether is then evaporated. The residual liquid is fractionally distilled and there is thus obtained 2-acetyl-3-methyl-5,6,7,8-tetrahydronaphthalene, B.P. 153–157° C. at 8 mm.

Example 18

A mixture of 50 parts of 2-isopropylamino-1-(5,6,7,8-tetrahydronaphth-2-yl)ethanol hydrochloride, 125 parts of maize starch, 270 parts of calcium phosphate and 1 part of magnesium stearate is compressed and the compressed material is then broken down into granules by passage through a 16-mesh screen. The granules so obtained are then compressed into tablets according to the known art. The tablets so obtained are suitable for oral use for therapeutic purposes.

When the 50 parts of 2-isopropylamino-1-(5,6,7,8-tetrahydronaphth-2-yl)ethanol hydrochloride used as starting material in the above process are replaced by 50 parts of 2-[N-(1-phenylprop-2-yl)amino]-1-(5,6,7,8-tetrahydronaphth-2-yl)ethanol hydrochloride, or by 50 parts of 2-ethylamino-1-(5,6,7,8-tetrahydronaphth-2-yl)ethanol hydrochloride, or by 50 parts of 2-[N-(1-hydroxy-2-methylprop-2-yl)amino]-1-(5,6,7,8-tetrahydronaphth-2-yl)ethanol hydrochloride, or by 50 parts of 2-t-butylamino-1-indan-5-ylethanol hydrochloride, there are likewise obtained tablet compositions which are suitable for oral use for therapeutic purposes.

Example 19

The following are typical formulations to provide tablets according to standard pharmaceutical techniques:

(i)

| | Mg. |
|---|---|
| 2-isopropylamino-1-(5,6,7,8-tetrahydronaphth-2-yl)ethanol hydrochloride | 200 |
| Lactose | 400 |
| 10% aqueous gelatine solution | 9 |
| Maize starch | 35 |
| Magnesium stearate | 6 |

(ii)

| | |
|---|---|
| 2-isopropylamino-1-(5,6,7,8-tetrahydronaphth-2-yl)-ethanol hydrochloride | 100 |
| Lactose | 100 |
| Maize starch | 25 |
| Gelatine | 5 |
| Stearic acid | 2.5 |

(iii)

| | |
|---|---|
| 2-isopropylamino-1-(5,6,7,8-tetrahydronaphth-2-yl)-ethanol hydrochloride | 50 |
| Lactose | 150 |
| Maize starch | 25 |
| Talc | 5 |

The 2-isopropylamino-1-(5,6,7,8-tetrahydronaphth-2-yl)ethanol hydrochloride is mixed with an inert diluent (lactose) and is granulated with a binding agent (starch paste, gelatine solution or acacia mucilage). A disintegrating agent (maize starch or alginic acid) is mixed with the granules and there is then added thereto a lubricating agent (magnesium stearate, stearic acid or talc). The mixture is compressed into tablets according to the known art and there are obtained tablets containing for example 50, 100 or 200 mg. of active ingredient and which are suitable for oral administration for therapeutic purposes.

We claim:

1. A homocyclic compound selected from the group consisting of compounds of the formula:

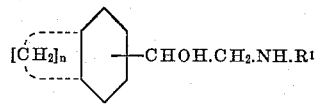

(I)

and compounds of the formula:

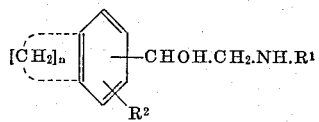

(II)

wherein $R^1$ is selected from the group consisting of branched-chain alkyl of from 3 to 4 carbon atoms and alkyl of not more than 4 carbon atoms substituted by a radical selected from the group consisting of hydroxy, phenyl and 3,4-dimethoxyphenyl; $n$ stands for an integer selected from the group consisting of 3 and 4; $R^2$ is selected from the group consisting of hydrogen and methyl; and the acid addition salts thereof.

2. A compound according to claim 1 having the structural Formula I wherein $n$ has a value of 4 and $R^1$ is a branched-chain alkyl containing from 3 to 4 carbon atoms.

3. A compound according to claim 1 having the structural Formula II wherein $n$ has a value of from 3 to 4, $R^1$ is a branched-chain alkyl containing from 3 to 4 carbon atoms and $R^2$ is hydrogen.

4. A homocyclic compound as claimed in claim 1 selected from the group consisting of 2-isopropylamino-1-(5,6,7,8-tetrahydronaphth-2-yl)ethanol,
2-[N-(1-phenylprop-2-yl)amino]-1-(5,6,7,8-tetrahydronaphth-2-yl)ethanol,
1-decahydronaphth-2-yl-2-isopropylaminoethanol,
2-[N-(1-hydroxy-2-methylprop-2-yl)amino]-1-(5,6,7,8-tetrahydronaphth-2-yl)ethanol,
1-indan-5-yl-2-isopropylaminoethanol,
2-s-butylamino-1-indan-5-ylethanol,
2-t-butylamino-1-indan-5-ylethanol,
2-[2-(3,4-dimethoxyphenyl)ethylamino]-1-indan-5-ylethanol,
2-(1-hydroxy-2-methylprop-2-ylamino)-1-indan-5-ylethanol,
2-t-butylamino-1-(5,6,7,8-tetrahydronaphth-2-yl)ethanol and
2-isopropylamino-1-(3-methyl-5,6,7,8-tetrahydronaphth-2-yl)ethanol, and the nontoxic, pharmaceutically acceptable acid addition salts thereof.

5. 2-isopropylamino-1-(5,6,7,8-tetrahydronaphth-2-yl)ethanol.
6. 2-[N-(1-phenylprop-2-yl)amino]-1-(5,6,7,8-tetrahydronaphth-2-yl)ethanol.
7. 1-decahydronaphth-2-yl-2-isopropylaminoethanol.
8. 2-[N-(1-hydroxy-2-methylprop-2-yl)amino]-1-(5,6,7,8-tetrahydronaphth-2-yl)ethanol.
9. 1-indan-5-yl-2-isopropylaminoethanol.
10. 2-s-butylamino-1-indan-5-ylethanol.
11. 2-t-butylamino-1-indan-5-ylethanol.
12. 2-[2-(3,4-dimethoxyphenyl)ethylamino]-1-indan-5-ylethanol.
13. 2-(1-hydroxy-2-methylprop-2-lyamino)-1-indan-5-ylethanol.
14. 2-t-butylamino-1-(5,6,7,8-tetrahydronaphth-2-yl)ethanol.
15. 2-isopropylamino-1-(3-methyl-5,6,7,8-tetrahydronaphth-2-yl)ethanol.

References Cited by the Examiner

UNITED STATES PATENTS

| | | |
|---|---|---|
| 1,799,110 | 3/1931 | Manske. |
| 1,913,520 | 6/1933 | Stolz et al. 260—570.6 |
| 1,957,092 | 5/1937 | Bockmuhl et al. 260—570.6 |
| 2,516,130 | 7/1950 | Long et al. 260—570.6 X |
| 2,541,342 | 2/1951 | Cusic 260—570.6 X |
| 3,058,987 | 10/1962 | Albrecht et al. 260—570.6 X |
| 3,076,847 | 2/1963 | Prelog 260—566 X |
| 3,099,599 | 7/1963 | Copp et al. 260—564 X |

OTHER REFERENCES

Elsevier, "Encyclopedia of Organic Chemistry," vol. 12B, Naphthalene Hydroxy Compounds, pp. 1121–1122 (1950).

Kasuya, C.A., vol. 53, pp. 4554–4553 (1959).

Kasuya et al., C.A., vol. 52, p. 17196c (1958).

Pfleger et al., Ber. Deut. Chem., vol. 90, pp. 1500–1512 (1957).

Stoll, Helv. Chim. Acta, vol. 33, pp. 1194–1207 (1950).

Wagner et al., "Synthetic Organic Chemistry," pp. 6 and 148–152 (1953).

CHARLES B. PARKER, *Primary Examiner.*